United States Patent …

(12) United States Patent
Aoki et al.

(10) Patent No.: US 7,823,416 B2
(45) Date of Patent: Nov. 2, 2010

(54) GLASS COMPOSITION AND METHOD FOR PRODUCING GLASS ARTICLE (75) Inventors: Shigeaki Aoki, Otsu (JP); Hiroki Nagai, Otsu (JP); Masataka Takagi, Otsu (JP)

(73) Assignee: Nippon Electric Gas Co., Ltd., Shiga-Ken (JP)

( * ) Notice: Subject to any disclaimer, the term of this patent is extended or adjusted under 35 U.S.C. 154(b) by 986 days.

(21) Appl. No.: 10/576,291

(22) PCT Filed: Oct. 19, 2004

(86) PCT No.: PCT/JP2004/015763

§ 371 (c)(1),
(2), (4) Date: Dec. 20, 2006

(87) PCT Pub. No.: WO2005/037721

PCT Pub. Date: Apr. 28, 2005

(65) Prior Publication Data

US 2007/0197366 A1    Aug. 23, 2007

(30) Foreign Application Priority Data

Oct. 20, 2003    (JP) .............................. 2003-358629

(51) Int. Cl.
*C03B 5/16*   (2006.01)
*C03B 5/18*   (2006.01)
*C03B 5/193*  (2006.01)

(52) U.S. Cl. ..................... 65/134.5; 65/29.12; 65/134.1

(58) Field of Classification Search ....................... None
See application file for complete search history.

(56) References Cited

U.S. PATENT DOCUMENTS 3,622,296 A * 11/1971 Buehl ......................... 65/32.5
3,929,440 A * 12/1975 Oldfield ...................... 65/32.5
5,446,008 A *  8/1995 Krolla et al. ................. 501/68
7,294,594 B2 * 11/2007 Kawamoto et al. ........... 501/27

(Continued)

FOREIGN PATENT DOCUMENTS

DE    197 46 715    4/1999

(Continued)

OTHER PUBLICATIONS

Aldrich et. al., "The occurance of He3 in natural sources of Helium", Physical Review v.74,n11,(1948), pp. 1590-1594.*

(Continued)

*Primary Examiner*—Jason L. Lazorcik
(74) *Attorney, Agent, or Firm*—Wenderoth, Lind & Ponack, L.L.P.

(57) ABSTRACT

The glass composition of the present invention is an inorganic glass composition in which the volume ratio of helium with a mass number of 3 to helium with a mass number of 4, namely $^3$He/$^4$He in the glass (0° C., 1 atm) is smaller than the volume ratio $^3$He/$^4$He in the atmosphere. The method of producing a glass article of the present invention includes the steps of: melting a glass raw material by heating; homogenizing molten glass; forming the molten glass into a desired shape; and cooling the shaped glass to room temperature, in which helium with a certain mass ratio is dissolved in the glass material so that the glass article of the present invention is obtained.

3 Claims, 1 Drawing Sheet

U.S. PATENT DOCUMENTS 7,451,621 B2 * 11/2008 Newlin et al. ............... 65/134.5
7,497,094 B2 * 3/2009 Takagi et al. ............... 65/134.5

FOREIGN PATENT DOCUMENTS

| EP | 1 473 284 | | | 11/2004 |
|----|-----------|---|---|---------|
| EP | 1679288 | A1 | * | 7/2006 |
| JP | 62-223028 | | | 10/1987 |
| JP | 02-080328 | | | 3/1990 |
| JP | 06-345442 | | | 12/1994 |
| JP | 9-15147 | | | 1/1997 |
| JP | 10-265226 | | | 10/1998 |
| JP | 2001-520763 | | | 10/2001 |
| JP | 2002-338255 | | | 11/2002 |
| JP | 2003-335526 | | | 11/2003 |
| JP | 2004-91307 | | | 3/2004 |
| JP | 2005145814 | A | * | 6/2005 |
| WO | WO 03066539 | A1 | * | 8/2003 |
| WO | WO 2005037721 | A1 | * | 4/2005 |

OTHER PUBLICATIONS

International Preliminary Report on Patentability including translation of Written Opinion dated Jul. 24, 2006 in the PCT Application corresponding to the present US Application.

* cited by examiner

GLASS COMPOSITION AND METHOD FOR PRODUCING GLASS ARTICLE

TECHNICAL FIELD

The present invention relates to an inorganic glass composition which is homogeneous in terms of composition and a method of producing a glass article having the glass composition.

BACKGROUND ART

Inorganic glass has various characteristic properties. Of those, various optical functions, and advantage such as formability with which the glass can be subjected to microprocessing, of the glass have allowed the glass to find use in various applications. Representative examples of the applications include: thin-sheet glasses for use in various image display devices such as a sheet glass for a liquid crystal display device and a sheet glass for a plasma display; glasses for optical parts such as lens parts for use in various optical fibers and optical related products surrounding optical fiber applications, and a cover glass for a solid state imaging device for use in image transfer; powder glasses for constructing fine structures for securing the reliability of various semiconductors and of image display devices such as a PDP; and glass products for building materials such as an exterior wall material made of crystallized glass and an interior wall material made of foam-containing glass.

Upon production of such various glass products, the products must be formed accurately into shapes needed for their applications. In view of the foregoing, techniques have been developed for a new forming method and various processing methods such as an abrasion method. In addition, many improvements and developments have been conducted on glass composition to optimize glass properties in accordance with required functions, and a large number of inventions have been made in association with the improvements and developments. In addition, the degree of uniformity in glass composition and the degree of inclusions of bubbles and stones in glass are recognized as homogeneity of glass that is also important in production as well as an article shape and a glass composition.

The measures of the degree of homogeneity of glass depend on the dimensions of a glass structure to which attention is paid, and the dimensions vary depending on the applications of the glass and required quality. In addition, the measures are roughly classified into three scales from an academic point of view. Of those, a measure referred to as a short-range order in dependence on the orientation direction of atomic arrangement (also referred to as a short-range structure) is the smallest measure. Next, a medium-range order is constituted by combining the short-range orders. In addition, a long-range order larger than the medium-range order corresponds to a distance in excess of 1 nm. When a glass structure is interpreted as a short-range order or a medium-range order, any kind of glass has its own structural coordination of elements in dependence on its composition, so it is hard to evaluate the glass by means of the concept of homogeneity in the structure of the glass. Therefore, the concept of homogeneity is applicable to the case where a dimension larger than 1 nm in excess of a medium-range order is taken into consideration. The concept of homogeneity can apply to express a glass state in a scale that is larger than a dimension where a disorder of glass structure can be generally defined. Although a glass structure that is interpreted as any one of those short- and medium-range structures plays an important role in describing the degree of homogeneity of glass, the concept of homogeneity in a larger range is most important in the stage of mass production of glass on a commercial scale.

For example, in such production stage on a commercial scale, the presence of a gas phase in a liquid phase (so-called the presence of bubbles in glass) is a major cause for a significant deterioration in degree of homogeneity of the glass. In addition, even when the problem of bubbles can be avoided, depending on glass composition, a devitrification phenomenon in association with the crystallization from molten glass may occur owing to thermal history, or a dissimilar glass phase having two or more different compositions is obtained. That is, attention must also be paid to a phenomenon referred to as chase separation. Glass defects referred to as a cord, a knot, a stripe, and the like have importance comparable to a degree of homogeneity, and have high risks of spoiling the unction and quality of glass. Those are caused by fluctuations in degree of homogeneity in the long-range order of a glass structure due to the deviation of some specific constituents in a glass composition.

Such heterogeneous sites in glass such as a cord and a knot can be optically detected. Therefore, a degree of optical homogeneity has been defined by representing the quality of glass through the measurement of a refractive index or the like with high accuracy. For example, each of Patent Document 1, Patent Document 2, and Patent Document 3 describes that a degree of homogeneity can be improved by causing such optical refractive index or the like to fall within a specific range.

[Patent Document 1] JP 06-345442 A
[Patent Document 2] JP 10-265226 A
[Patent Document 3] JP 2002-338255 A However, the degree of optical homogeneity of glass and the degree of homogeneity of the glass composition of the glass do not necessarily coincide with each other. For example, a value for the refractive index of glass used as an indication for the degree of optical homogeneity of the glass can be intentionally changed by adjusting the cooling condition for a formed hot glass article. That is, even when two glasses to be compared with each other have different glass compositions, an appropriate adjustment of a cooling rate can control the refractive indices of the two glasses to be the same. In addition, even when two glasses to be compared with each other have the same composition, an intentional adjustment of a stress steadily acting on each of the glasses can make the two glasses different from each other in refractive index. For example, in actuality, some commercially available optical glasses have the same refractive index and different compositions. Therefore, measuring only the refractive index of each of two glasses to be compared with other does not correspond to a comparison between the degrees of homogeneity of the glasses in terms of composition through measurement, and merely evaluates the glasses only for optical homogeneity.

Meanwhile, it has been requested to have the uniform composition in various high-performance glass products to satisfy multiple difficult demands such as precise dimensional accuracy as well as high chemical durability. For example, when one attempts to form a fine surface shape on a glass article through an etching treatment or the like, the glass surface must be eroded at the same etching rate. This is because a slight deviation in glass composition caused by a reduction in degree of homogeneity affects the amount of a surface to be eroded by etching per unit time, thereby resulting in an inferior surface quality of a glass article. To avoid such circumstance, with a view to realizing a high level of homogeneity of composition, the measurement of multiple physical properties in addition to the above refractive index has been performed to complement the limitation of the precise analysis of glass composition realized by means of a chemical analysis method.

In addition, a tracer method is used as means for confirming a homogeneous production condition at a melting stage or as one promising method of evaluating a flow characteristic in a glass melting furnace. The method involves: adding a trace amount of a metal oxide having a glass coloring effect such as cobalt oxide as a tracer to a glass raw material or mixing lead oxide that can be analyzed in a trace amount as a tracer without any coloring; and evaluating the change of a concentration of such tracer in a glass article with time. Thus, the thermal hysteresis of molten glass inside a glass melting furnace or the degree of mixing due to glass convection, that is, the degree of homogeneity can be detected. However, a glass melting furnace is provided with a small number of openings for preventing heat loss during its operation at high temperature, so it is difficult to incorporate a predetermined amount of tracer into molten glass at an arbitrary position inside the melting furnace. In addition, there arises a problem in that the tracer method cannot be performed very frequently because the method involves the occurrence of the unexpected coloring of a glass product, a change in physical property of glass due to the mixing of a heavy element, or the like.

DISCLOSURE OF THE INVENTION

The inventors of the present invention have embarked on the task of developing a glass composition which enables a production condition under which glass can be homogenized at a melting stage to be established, which can be adopted for properly evaluating produced glass for degree of homogeneity of composition, and which does not color a glass product or the like, and a method of producing a glass article of the glass composition. The inventors have presented the results of the task here.

The glass composition of the present invention is an inorganic glass composition, and is characterized in that a volume ratio of an isotope of helium with a mass number of 3 to an isotope of helium with a mass number of 4 in the glass (0° C., 1 atm) is smaller than a volume ratio of the isotope of helium with a mass number of 3 to the isotope of helium with a mass number of 4 present in the atmosphere (0° C., 1 atm).

In general, helium (He) is classified into a category called a noble gas or an inert gas. The atomic structure of helium is a structurally stable closed-shell structure, and helium is present as a monoatomic molecule. Helium is the lightest element of the noble gas elements, and is a component which has an extremely small size, which has an extremely small attracting force due to a Van der Waals force, and which stays as a liquid without being solidified under normal pressure even at absolute zero.

Six kinds of isotopes of helium (He) each having a mass number ranging from 3 to 8 have been identified. The isotopes except an isotope with a mass number of 4 (a proton number of 2, a neutron number of 2, and an electron number of 2) and an isotope with a mass number of 3 (a proton number of 2, a neutron number of 1, and an electron number of 2) are unstable, so two kinds of isotopes are generally well known: $^4$He as an isotope with a mass number of 4 and $^3$He as an isotope with a mass number of 3. An isotope is also called an isotope, an isotopic element, an isotopic species, an isotopic nucleus, or the like. Isotopes are nuclear species having the same proton number (that is, an atomic number) and different from each other in mass number of an element defined as the sum of a proton number and a neutron number.

In the atmosphere, a ratio of the isotope with a mass number of 3 ($^3$He) to the isotope with a mass number of 4 ($^4$He) is one seven hundred thousandth. That is, $1.4 \times 10^{-6}$ (=1.4 ppm). A value for the volume ratio of $^3$He to $^4$He (hereinafter, the volume ratio is referred to as $^3$He/$^4$He) of helium in the glass composition of the present invention is smaller than a value for the volume ratio $^3$He/$^4$He of helium present in the atmosphere. As described above, a glass article with helium having a volume ratio $^3$He/$^4$He smaller than that of helium in the atmosphere can be clearly distinguished from a glass article with helium eluted from the atmosphere into molten glass in the ordinary production steps of the glass article.

For example, helium having a value for a volume ratio $^3$He/$^4$He different from that in the atmosphere is introduced into molten glass. Values for the volume ratio $^3$He/$^4$He in some glass specimens sampled from adquate positions in a glass melting furnace and from a glass article after cooling are measured by means of a measuring device. Then, the values for the volume ratio $^3$He/$^4$He are compared with the value for the volume ratio $^3$He/$^4$He in the atmosphere. Thus, whether each measured value falls to a value for the volume ratio $^3$He/$^4$He within a predetermined range smaller than the value for the volume ratio $^3$He/$^4$He of helium dissolved in the glass article from the atmosphere can be known. As a result, the performance of a melting and homogenizing effect in the glass melting furnace in which the molten glass is mixed homogeneously in terms of composition can be detected so as to consider whether the molten glass has composition favorably homogenized for the glass article.

In addition, the value for the volume ratio $^3$He/$^4$He in a glass article is preferably reduced in order to distinguish easily from that of helium in the atmosphere. From such viewpoint, the value for the volume ratio $^3$He/$^4$He is preferably $1.3 \times 10^{-6}$ (0° C., 1 atm) or less, more preferably $1.2 \times 10^{-6}$ (0° C., 1 atm) or less, more preferably $1.1 \times 10^{-6}$ (0° C., 1 atm) or less, more preferably $1.0 \times 10^{-6}$ (0° C., 1 atm) or less, or more preferably $0.8 \times 10^{-6}$ (0° C., 1 atm) or less.

In addition, a difference in mass number between $^3$He and $^4$He, and the value for the volume ratio $^3$He/$^4$He can be compared through analysis by means of, for example, a mass spectrometer. Therefore, whether helium of interest originates from the atmosphere can be made clear through analysis. Furthermore, it is acknowledged that $^3$He and $^4$He are different from each other in not only mass number but also physical property such as a vapor pressure. Therefore, adopting an analysis approach based on such difference in physical property can analyze a ratio between them. In addition, when mass spectrometry or the like is adopted as means for measuring the amount of the isotopic element with a mass number of 3 and that of the isotopic element with a mass number of 4, for example, a glass sample may be subjected to pulverization, fusion, laser extraction, or the like so that an isotopic element of helium in glass is introduced into a mass spectrometer or the like.

In addition to the above statement, the glass composition of the present invention is suitable in which the volume ratio of the isotope of helium with a mass number of 3 to the isotope of helium with a mass number of 4 in the glass is $0.8 \times 10^{-6}$ or less (0° C., 1 atm).

Setting the value for the volume ratio $^3$He/$^4$He to be equal to or less than $0.8 \times 10^{-6}$ (0.8 ppm) enables glass to be evaluated for homogeneity with improved ease and improved reliability. For an additional improvement in reliability, the value for the volume ratio $^3$He/$^4$He preferably falls within the range of $1.0 \times 10^{-9}$ to $0.8 \times 10^{-6}$. The value for the volume ratio $^3$He/$^4$He more preferably falls within the range of $0.5 \times 10^{-8}$ to $0.8 \times 10^{-6}$, or more preferably falls within the range of $0.5 \times 10^{-8}$ to $5 \times 10^{-7}$.

In addition to the above statement, the glass composition of the present invention is suitable in which a total content of the isotope of helium with a mass number of 4 and the isotope of helium with a mass number of 3 in the glass is $5.0 \times 10^{-5}$ to 2 μL/g (0° C., 1 atm).

Although helium is not involved in the formation of the network structure of glass in glass composition, incorporating $5.0 \times 10^{-5}$ μl/g or more of helium into the glass composition enables a ratio of the isotope with a mass number of 3 ($^3$He) or the isotope with a mass number of 4 ($^3$He) to helium in the glass to be specified with reliability by means of a mass spectrometer or the like. In addition, the above content of helium promotes the clarification of a fine air bubble remaining in molten glass. On the other hand, in a state where a large amount of helium is dissolved in glass, particularly when helium is used in applications where glass that has been shaped once is heated again, helium may be responsible for reboiling. Therefore, the total content of helium in a glass composition is preferably 2 μL/g (0° C., 1 atm) or less.

In addition, the glass composition of the present invention is suitably an multicomponent oxide glass.

A ratio between constituents in an multicomponent oxide glass can be represented as an oxide component ratio, and the glass contains two or more kinds of oxides. In addition, preferably, the total content of the two or more oxides is intentionally 50 mass % or more. In addition, the case where a glass composition that can be represented as a single oxide composition is mixed with multiple components as impurities does not correspond to the multicomponent oxide glass in the present invention. For example, when the contents of components in a glass composition are represented in units of mass %, a glass composition containing a single oxide component the content of which is close to 99% and containing multiple components the content of each of which is on the order of $10^{-2}$ mass %, that is, 0.09 mass % or less does not correspond to the multicomponent oxide glass of the present invention.

In multicomponent-based glass, bringing each of multiple components in a molten glass into a homogeneous state is important for a glass article to have its designed property. The multicomponent oxide glass of the present invention may be mixed with any other component as long as the glass is mainly composed of multiple oxides. For example, the mixing of a glass composition with a trace amount of gas component such as chlorine or fluorine is allowed if necessary.

In addition, the glass composition of the present invention is suitably a silicate glass.

The term "silicate glass" refers to glass mainly composed of silica ($SiO_2$). The application of the present invention to a silicate glass can provide a glass material to be used for many applications with a high degree of homogeneity.

The glass composition of the present invention is suitable in which a transmittance for a thickness of 1.0 mm is 99.9% or less with respect to a light beam having a predetermined wavelength within a wavelength range of 200.0 nm to 1,050.0 nm.

That is, a transmittance for a thickness of glass of 1.0 mm is preferably within the range of 0% to 99.9% with respect to a light beam having an arbitrary single wavelength selected from the wavelength range from 200.0 nm corresponding to ultraviolet light to 1,050 nm corresponding to infrared light including 360 nm to 830 nm corresponding to visible light.

In addition, the term "transmittance" as used herein does not mean a measured value in a state where the surface of glass is subjected to special coating or the like, but means the internal transmittance of the glass from which reflection at the outer surface of the glass upon incidence of a light beam on the surface of the glass and reflection at the inner surface upon emission of the light beam from inside the glass are subtracted, and the internal transmittance is a value independent of the surface state of the glass. It should be noted that, the transmittance is preferably measured in a state where the surface roughness (Ra value) of the surface of the glass is 0.5 nm or less. The transmittance is defined by a measured value obtained by means of an integrating sphere in a so-called optical mirror surface state.

Transmittance is basic property out of the optical properties of glass. In addition to absorption and scattering phenomenon due to a specific component in the glass, and the like, the homogeneity of composition inside the glass plays an important role in setting a value for the transmittance to be at a desired level or higher. That is, satisfying optical homogeneity in addition to compositional homogeneity enables the quality of the glass composition of the present invention to be realized with improved favorableness.

The glass composition of the present invention is suitably sealed with a member composed of one material selected from the group consisting of a glass, a ceramic, and a metal under heat, to be used.

In this case, the glass composition of the present invention is sealed with the above member under heat to have, for example, one function, whereby the resultant is used as a structural member or the like.

The glass composition used in this application has, for example, a thin sheet-like shape or a tubular shape. It is the glass composition that softens upon sealing with the above member under heat. Therefore, the homogeneity of the glass composition is important because it affects the formation of a preferable softened shape, chemical durability after sealing, or the like. In case that glass composition is homogeneous in a large-scale production, it is possible to obtain glass articles effectively that have the same quality in physical and chemical properties such as the formation of a preferable softened shape and chemical durability after sealing, and the glass articles each having stable quality. The heating here can be performed by means of any method without any problem. For example, heating by means of a burner, heating by means of an indirect electric resistance heating element, heating by means of infrared radiation, or the like can be adopted.

In addition, the shape of the glass composition of the present invention is not limited to a thin sheet-like shape and a tubular shape. The glass composition may have a powdery shape, a particulate shape, a granular shape, a flaky shape, a fibrous shape, a rod-like shape, or any other shape. In this case, the glass composition of the present invention may be used in combination with any other material. For example, the glass composition of the present invention can contain any other material as a filler. The kind of a material to be contained as a filler is not particularly limited, and examples of an available ceramic powder filler include titania, alumina, zirconia, silica, magnesia, zircon, barium zirconate, cordierite, lead titanate, barium titanate, mullite, zinc oxide, tin oxide, silicon carbide, and uremanite.

The glass composition of the present invention is suitably obtained as a result of crystallization inside glass and/or on a surface of the glass.

The phrase "obtained as a result of crystallization inside glass and/or on the surface of the glass" refers to a state where multiple inorganic crystals are formed inside glass or on the surface of the glass.

The kind and size of the crystal are not particularly limited. In addition, multiple kinds of crystals and multiple particle shapes may be used without a hitch. In any case, a crystal is preferably dispersed in whole. In addition, the dispersion of a particle preferably has no seggregation at a long-range order level so that the desired mechanical properties of glass can be realized.

During crystallization inside glass and/or on the surface of the glass, securing compositional homogeneity can control variations in kinds of crystals to be formed and the like to fall within a predetermined range. As a result, stable strength and heat characteristics can be realized when a glass article is used as crystallized glass.

In addition, the glass composition of the present invention can be added with an additive such as a fining agent, a discoloring agent, a coloring agent, an emulsifier, an oxidant, or a reducing agent. Furthermore, any other material insoluble in glass can be homogeneously mixed with glass.

The glass composition of the present invention can be available in various applications. Examples of the applications include: sheet glasses for substrates for image display devices such as a glass for a CRT, a sheet glass for a liquid crystal display substrate, a sheet glass for a PDP substrate, and a sheet glass for a field emission display substrate; cover glasses for solid state imaging devices such as a CCD and a CMOS; tubular glasses for electronic components such as a tubular glass for a reed switch, a tubular glass for a diode, and a tubular glass for a xenon lamp; glasses for building materials such as a glass block and a crystallized glass for a wall material; medical glasses such as a capillary for an ampoule and a glass for a defense window for shielding radiation; glasses for illumination such as a tubular glass for a fluorescent lamp and a tubular glass for a liquid crystal backlight; glasses for optical parts such as a glass for a lens and a ferrule for connecting an optical fiber; powder glasses for airtight sealing such as a powder glass for a multilayer substrate and a powder glass for a PDP; and glass fibers such as an E fiber and an A fiber of which composite materials to be used as an FRP, an FRC, and the like are formed.

A method of producing the glass article of the present invention includes the steps of: melting a glass raw material by heating; homogenizing molten glass; forming the homogenized molten glass into a predetermined shape; and cooling the shaped formed glass article to room temperature, and is characterized in that, in at least one of the step of melting a glass raw material by heating and the step of homogenizing molten glass, a helium gas is brought into contact with the molten glass so that helium is dissolved in a glass article in such a manner that a volume ratio of an isotope of helium with a mass number of 3 to an isotope of helium with a mass number of 4 (0° C., 1 atm) is smaller than a volume ratio of the isotope of helium with a mass number of 3 to the isotope of helium with a mass number of 4 present in the atmosphere (0° C., 1 atm).

That is, in a series of glass production processes involving: heating a glass raw material prepared by mixing multiple raw materials to yield molten glass; subjecting the molten glass to, for example, a physical mixing operation such as stirring or bubbling to homogenize the composition of the molten glass; forming the resultant into a predetermined shape such as a sheet, a tube, a sphere, or a container by means of various forming methods; and cooling the resultant to room temperature, in one of the melting step of heating the glass raw material to cause a vitrification reaction so that the glass raw material is brought into a molten state and the above step of homogenizing the composition of the molten glass, helium is directly brought into contact with the molten glass to be dissolved in a glass article in such a manner that the above volume ratio of helium is smaller than the above volume ratio of helium in the atmosphere, that is, $1.4 \times 10^{-6}$ (0° C., 1 atm).

In addition, the value for the above volume ratio of helium is suitably reduced in order to be distinguishable form that of helium in the atmosphere. From such viewpoint, the value for the above volume ratio is preferably $1.3 \times 10^{-6}$ (0° C., 1 atm) or less, more preferably $1.2 \times 10^{-6}$ (0° C., 1 atm) or less, more preferably $1.1 \times 10^{-6}$ (0° C., 1 atm) or less, more preferably $1.0 \times 10^{-6}$ (0° C., 1 atm) or less, or more preferably $0.8 \times 10^{-6}$ (0° C., 1 atm) or less.

The above respective steps may be mutually continuous, or may be separated from other steps. For example, the steps of melting a glass raw material, quenching the molten glass to create a cullet and re-melting the cullet to have good homogeneity may be performed in another facility. That is, technique for promoting homogenization by using a rough melt cullet can be applied in combination. Furthermore, the following procedure can be derived from the extension of this thought. That is, multiple kinds of glasses having different compositions may be created as quench glasses, and they may be appropriately mixed at a step of remelting them. In such case, the values for the volume ratio $^3He/^4He$ of multiple kinds of glasses are intentionally caused to differ from each other, and a value for the volume ratio $^3He/^4He$ of glass obtained by mixing the glasses is confirmed. Thus, the degree of homogeneous mixing can be confirmed.

In addition, in the step of melting a glass raw material by heating, any method for heating may be used. For example, a heating method based on a burner using a liquid or gas fuel or the like, a heating method indirectly or directly utilizing electricity, an electromagnetic wave such as infrared light, or the like can be adopted. Furthermore, natural raw materials, artificially purified products, or the like can be used as the glass raw material. Of course, a glass cullet can also be used. Furthermore, any one of various mixing operations can be adopted for the step of homogenizing molten glass. Examples of the operations include stirring by means of a stirrer, bubbling, and an ultrasonic wave.

A method of dissolving helium in a glass article is not particularly limited. The bubbling of a helium gas into molten glass, or the diffusion of helium from a melting atmosphere above molten glass can be adopted. Furthermore, a predetermined amount of helium may be dissolved in a cullet to be used as a glass raw material in advance.

In addition to the above statement, the method of producing the glass article of the present invention is suitable in which helium is dissolved in a glass article in such a manner that the volume ratio of the isotope of helium with a mass number of 3 to the isotope of helium with a mass number of 4 in the glass article is $0.8 \times 10^{-6}$ or less (0° C., 1 atm) and a total content of the isotope with a mass number of 4 and the isotope with a mass number of 3 is $5.0 \times 10^{-5}$ to $2$ μl/g (0° C., 1 atm).

A volume ratio of the isotope with a mass number of 3 to the isotope with a mass number of 4 of $0.8 \times 10^{-6}$ or less (0° C., 1 atm) is suitable for determination as to whether a glass article is of homogeneous composition. Furthermore, helium is preferably dissolved in a glass article in such a manner that the total content of the isotope with a mass number of 4 and the isotope with a mass number of 3 is $5.0 \times 10^{-5}$ to $2$ μl/g (0° C., 1 atm) because reliability in the measurement of a volume ratio between the above isotopes can be improved.

In addition, in the above constitution, molten glass may be melted and homogenized while the molten glass is evaluated for degree of homogeneity of composition by measuring a value for the volume ratio $^3He/^4He$ in the molten glass.

Because the above result of the evaluation may be reflected in the setting or change of various conditions of a facility for melting glass or the like, an optimization of production condition to improve the degree of homogeneity of the glass can be done.

The conditions of a melting facility or the like include: furnace temperature; the gas concentration of an atmosphere in a furnace; a furnace pressure; a charging rate of at a raw material; a preparation of a raw material such as pulverization and granulation; a forming index of glass; a bubbling rate; a bubbling gas concentration; the rotational speed of a stirrer; and the amount of a glass cullet to be used.

In addition, the melting and homogenization of molten glass based on the evaluation for degree of homogeneity may adopt, for example, a method involving: directly coupling a melting facility with a facility for measuring the above volume ratio; and reflecting in real time the measured value in a condition under which a furnace is operated. Alternatively, a method involving: measuring the above volume ratio by means of various methods in an environment separated from a melting facility; and changing a production condition for glass on the basis of the result may be adopted.

Further, with the above construction, the step of homogenizing molten glass is suitably intended for homogenizing the molten glass in such a manner that a volume ratio of the isotope of helium with a mass number of 3 to the isotope of helium with a mass number of 4 in glass is in a range of $1.0 \times 10^{-9}$ to $0.8 \times 10^{-6}$.

Setting the above value for the volume ratio $^3$He/$^4$He to be equal to or more than $1.0 \times 10^{-9}$ enables the presence of helium with a mass number of 3 to be detected surely, so a preferred result can be obtained. On the other hand, the above value for the volume ratio $^3$He/$^4$He is preferably set to be equal to or less than $0.8 \times 10^{-6}$ because the value can be clearly distinguished from the value for the volume ratio $^3$He/$^4$He in the atmosphere. The value for the volume ratio $^3$He/$^4$He falls within the range of more preferably $0.5 \times 10^{-6}$ to $0.8 \times 10^{-6}$, or still more preferably $0.5 \times 10^{-8}$ to $5 \times 10^{-7}$.

The method of producing a glass article of the present invention is not particularly limited except for the foregoing points. For example, any forming method can be adopted as a method of forming glass, and the formed glass may be secondarily processed by means of any processing means without a hitch. For example, in the case where a sheet glass is formed, any one of forming methods such as a float method, a fusion method, a slit down method, and a roll forming method can be adopted as a forming method. In addition, any one of various processing methods such as polishing, redrawing, mechanical scribing, and laser scribing can be adopted as a method of processing the sheet glass after forming. Furthermore, the surface of the sheet glass may be provided with chemical treatments such as various etchings, a film, a functional thin film, or the like, whereby the sheet glass is applicable to various applications.

The present invention exerts the following effects.

(1) As described above, the glass composition of the present invention is an inorganic glass composition. In the glass composition, a volume ratio of the isotope of helium with a mass number of 3 to the isotope of helium with a mass number of 4 in glass (0° C., 1 atm) is smaller than that of the isotope of helium with a mass number of 3 to the isotope of helium with a mass number of 4 in the atmosphere (0° C., 1 atm). Therefore, for example, volume ratios of helium isotopes in multiple glass sampling samples collected with time or spatially from molten glass melted in a melting facility are measured, and the measured values are compared, whereby the fact that each of various compositional components constituting a glass article has received favorably managed thermal hysteresis can be confirmed. In other words, the fact that various compositional components constituting a glass article are uniformly present in the glass article, so a homogeneous state with no offset of glass composition is established can be confirmed. Therefore, uniform properties and functions can be stably realized for the various properties of glass in dependence on glass composition.

(2) The homogeneity of the glass composition of the present invention can be confirmed with improved ease as long as the volume ratio of the isotope of helium with a mass number of 3 to the isotope of helium with a mass number of 4 in the glass composition is $0.8 \times 10^{-6}$ or less (0° C., 1 atm) because the volume ratio is clearly different from the volume ratio between helium isotopes originating from helium species present in the air. In addition, grasping the dispersed state of helium into glass with improved accuracy enables a function which is realized by predetermined glass composition and which is needed for its application to be achieved with high reliability.

(3) As long as the total content of the isotope of helium with a mass number of 4 and the isotope of helium with a mass number of 3 in the glass composition of the present invention is $5.0 \times 10^{-5}$ to 2 µl/g (0° C., 1 atm), a ratio of the isotope of helium with a mass number of 3 ($^3$He) to the isotope of helium with a mass number of 4 ($^4$He) in the glass article can be specified with high reliability by means of any one of various measuring devices such as a mass spectrometer.

(4) The glass composition of the present invention is applicable to a wide variety of applications as long as it is an multicomponent oxide glass or a silicate glass. The homogenization of the glass composition of a glass article can be confirmed, for example, even when the glass article has such shape or dimensions that a high-accuracy method measuring the degree of optical homogeneity is hardly adopted, when the glass article contains a large amount of coloring component, or when the glass article is of composition involving crystallization.

(5) As long as the glass composition of the present invention has a transmittance for a thickness of 1.0 mm of 99.9% or less with respect to a light beam having a predetermined wavelength within the wavelength range of 200.0 nm to 1,050.0 nm, the glass composition has compositional homogeneity as well as optical homogeneity specified by a method for evaluation for degree of homogeneity of a refractive index or the like, so the glass composition can realize various stable physical properties needed for a functional material to be mounted on an optical related product having high performance.

(6) As long as the glass composition of the present invention is used in applications where the glass composition is sealed with a member composed of one material selected from the group consisting of a glass, a ceramic, and a metal under heat, identical, stable performance can be realized for the shape of a sealing site and for physical and chemical functions after sealing because the glass composition is a material having compositional homogeneity.

(7) As long as the glass composition of the present invention is obtained as a result of crystallization inside glass and/or on the surface of the glass, a defective site having brittle strength hardly occurs, so excellent performance can be realized.

(8) The method of producing a glass article of the present invention includes the steps of: melting a glass raw material by heating; homogenizing molten glass; forming the homogenized molten glass into a predetermined shape; and cooling the shaped formed glass article to room temperature. In the method, in at least one of the step of melting a glass raw material by heating and the step of homogenizing molten glass, a helium gas is brought into contact with the molten glass so that helium is dissolved in the glass in such a manner that a volume ratio of the isotope of helium with a mass number of 3 to the isotope of helium with a mass number of 4 (0° C., 1 atm) is smaller than a volume ratio of the isotope of helium with a mass number of 3 to the isotope of helium with a mass number of 4 present in the atmosphere (0° C., 1 atm). Thus, the homogeneity of composition of the molten glass can be improved efficiently, thereby enabling high functional glass for use in various applications to be produced in high production yield.

(9) In the method of producing a glass article of the present invention, as long as a helium gas is brought into contact with molten glass in such a manner that a volume ratio of the isotope of helium with a mass number of 3 to the isotope of helium with a mass number of 4 in the molten glass is $0.8 \times 10^{-6}$ or less (0° C., 1 atm) and the total content of the isotope with a mass number of 4 and the isotope with a mass number of 3 is in the range of $5.0 \times 10^{-5}$ to 2 µl/g (0° C., 1 atm), the degree of homogeneity of the molten glass can be easily evaluated with high accuracy.

(10) In the method of producing a glass article of the present invention, molten glass is melted and homogenized while the molten glass is evaluated for degree of homogeneity by measuring the volume ratio of the isotope of helium with a mass number of 3 to the isotope of helium with a mass number of 4 in the molten glass, a formed glass, or a glass article, monitoring the degree of homogeneity of glass by means of the above volume ratio as an indicator enables one to take measures to correct various fluctuation factors in glass production quickly. Thus, even when a compositionally heterogeneous portion occurs in glass irregularly in a glass production facility, measures to dissolve the problem can be taken quickly, so a glass article having high degree of homogeneity can be produced continuously.

(11) In the method of producing a glass article of the present invention, as long as the step of homogenizing molten glass is intended for homogenizing the molten glass in such a manner that a volume ratio of the isotope of helium with a mass number of 3 to the isotope of helium with a mass number of 4 in a glass article is in the range of $1.0 \times 10^{-9}$ to $0.8 \times 10^{-6}$, a variation in performance of a glass product resulting from a variation in compositional homogeneity of glass can be reduced to the extent possible, and a function needed for design can be realized.

(12) In addition, the method of producing a glass article of the present invention can realize the homogenization of a glass article through the adoption of a tracer which does no harm to the environment and does not color the glass article even when it is mixed into the glass article. The method is suitably used as a method of producing a glass article while monitoring the process of homogenizing the glass article.

BRIEF DESCRIPTION OF THE DRAWINGS

FIG. 1 are explanatory views of a glass melting furnace in which a production method of the present invention is performed, in which

BEST MODE FOR CARRYING OUT THE INVENTION

Hereinafter, the glass composition of the present invention and the method of producing the same will be described on the basis of examples.

Example 1

Table 1 shows an example of the glass composition of the present invention. The glass composition of Table 1 is a material for use in: a fine tubular glass for an electronic component; a thin-sheet glass for an FPD; a glass for shielding radiation; a medical glass; a material glass for crystallized glass; or a glass fiber for an FRP, and is an oxide multicomponent-based silicate glass. For any sample, each of multiple glass raw materials such as metal oxides and other chemical compounds were weighed in advance, and the materials were mixed by means of a small rotary mixer in such a manner that raw material segregation or the like would not occur, to thereby create a glass raw material batch. After that, the glass raw material batch was charged in a high-temperature-heat-resistant container having an internal volume of 1,000 cc and made of a platinum alloy (a platinum-rhodium 15% container), and melting was performed in a closed electric furnace for a melting time of 16 hours under a temperature condition managed in such a manner that each glass composition would have a viscosity smaller than $1 \times 10^3$ dPa·sec (temperatures from, 1,480° C. to 1,600° C.). Then, the raw material batch was melted through a high-temperature chemical reaction to complete vitrification. From the time point 2 hours after the completion, the cock of a gas-introducing tube inserted into the closed electric furnace was opened, and a helium gas having a value for a volume ratio of an isotope with a mass number of 3 to an isotope with a mass number of 4, that is, $^3\text{He}/^4\text{He}$ adjusted in advance to be equal to or less than $0.8 \times 10^{-6}$ or less (for example, $1.0 \times 10^{-7}$) was introduced into the atmosphere in the furnace above molten glass, thereby the helium gas was introduced into glass through diffusion into the molten glass. Then, each glass was subjected to a treatment for diffusing helium for at least 5 hours. Furthermore, the molten glass was homogenized through a stirring operation by means of a stirrer for molten glass attached to the inside of the furnace. After that, the molten glass was flown into a carbon frame. After that, the glass was held in an annealing furnace. After 2 days of annealing operation, the temperature of the glass was reduced to room temperature, and a helium content in the resultant glass, and a volume ratio of an isotope with a mass number of 3 to an isotope with a mass number of 4 for the helium were measured. In addition, the glass composition of the glass was confirmed by using wet chemical analysis and instrumental analysis in combination. Thus, it was confirmed that the glass was of target composition. Table 1 summarizes the above results.

For each measured value, a method of measuring helium involves: collecting 10 to 500 mg of sample from a glass piece cooled to room temperature; loading the glass into an molybdenum crucible in a furnace heated at 1,600° C.; holding the glass in the crucible for 20 minutes; collecting gases in glass by means of vacuum extraction; introducing the gases into a mass spectrometer; ionizing He in the device; separating isotopes by means of a magnetic field; detecting an ion by means of a Faraday cup; and amplifying the detected ion by means of an amplifier. The device used for the analysis is a double collector-type noble gas mass spectrometer manufactured by Micromass. In addition, the ICP atomic emission spectrometer used for composition analysis of glass is an SPS 1500VR manufactured by Seiko Instruments Inc. with which a secondary electron multiplier (SEM) is mounted for an improvement in measurement sensitivity. One analysis required about 0.5 g of glass.

TABLE 1

| (mass %) | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 71.2 | 66.3 | 34.1 | 72.6 | 62.9 | 65.0 | 59.3 | 79.5 | 62.9 | 66.8 | 54.5 | 57.3 |
| PbO | — | — | 54.6 | — | — | — | — | — | — | — | — | 28.8 |
| $Al_2O_3$ | 1.9 | 22.5 | — | 6.9 | 3.0 | 16.1 | 15.4 | 2.6 | 15.7 | 11.3 | 13.8 | 1.1 |
| $B_2O_3$ | 0.8 | — | 3.0 | 10.2 | 8.1 | 9.9 | 9.5 | 13.5 | 10.2 | 11.2 | 7.3 | — |
| MgO | — | 0.7 | — | — | — | — | — | — | 1.2 | 2.4 | 2.3 | — |
| CaO | — | — | 0.4 | 0.5 | 0.3 | 8.0 | 5.6 | — | 6.5 | 4.3 | 21.0 | — |
| SrO | 1.0 | — | — | — | — | 1.0 | 5.6 | — | 0.9 | 2.1 | 0.1 | — |
| BaO | 5.8 | — | 5.1 | 2.1 | 1.3 | — | 3.6 | — | 0.5 | 1.5 | 0.3 | — |
| ZnO | — | — | — | — | 6.9 | — | 0.5 | — | 1.8 | 0.2 | — | — |
| $Li_2O$ | 2.8 | 4.0 | — | — | — | — | — | — | — | — | — | — |
| $Na_2O$ | 4.1 | 0.4 | 0.4 | 6.4 | 6.8 | — | — | 4.3 | — | — | 0.2 | 3.5 |
| $K_2O$ | 9.4 | 0.2 | 1.9 | 1.3 | 6.9 | — | — | — | — | — | 0.1 | 8.8 |
| $Fe_2O_3$ | 3.0 | 0.1 | — | 0.1 | — | — | — | — | — | — | 0.2 | 0.0 |
| $P_2O_5$ | — | 1.4 | — | — | — | — | — | — | — | — | — | — |
| $ZrO_2$ | — | 2.5 | — | — | — | — | — | — | — | — | — | — |
| $SnO_2$ | — | 1.9 | — | — | — | — | — | — | 0.1 | — | — | — |
| $TiO_2$ | — | — | — | — | 3.3 | — | — | — | — | — | 0.2 | — |
| $Sb_2O_3$ | — | — | 0.50 | 0.03 | 0.50 | — | 0.50 | — | 0.10 | 0.20 | — | 0.50 |
| $Cl_2$ | — | — | — | — | — | — | — | 0.1 | 0.1 | — | — | — |
| He ($\times 10^{-3}$: μl/g) | 222.1 | 124.1 | 107.7 | 78.1 | 0.2 | 2.1 | 47.4 | 562.1 | 53.1 | 10.0 | 24.5 | 34.1 |
| $^3He/^4He$ ($\times 10^{-7}$) | 1.01 | 0.93 | 0.92 | 0.94 | 1.23 | 1.05 | 2.77 | 2.21 | 1.42 | 2.91 | 0.98 | 2.63 |

Table 1 confirmed that each of the glasses (Sample No. 1 to Sample No. 12) had a value for the volume ratio $^3He/^4He$ in the range of $0.92\times10^{-7}$ to $2.91\times10^{-7}$, had a helium content in the glass in the range of $0.2\times10^{-3}$ microliter (μl)/g to $562.1\times10^{-3}$ μl/g, showed no deterioration in degree of homogeneity of glass judged from the observation of the external appearance of a bubble, a cord, or the like, and hence was the glass composition of the present invention.

Example 2

Figure 1A:
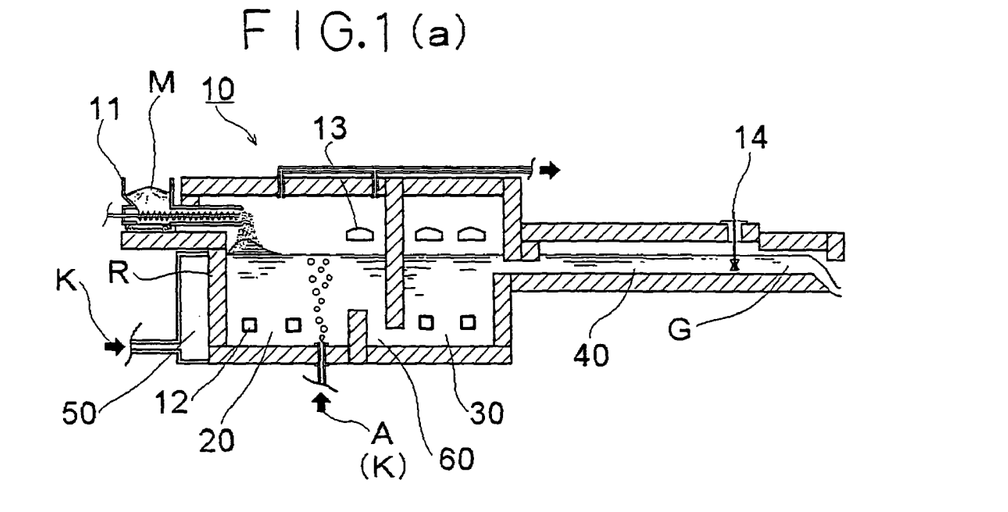
FIG. 1(a) is a sectional view and FIG. 1(b) is a plan view of a main portion.
Figure 1B:
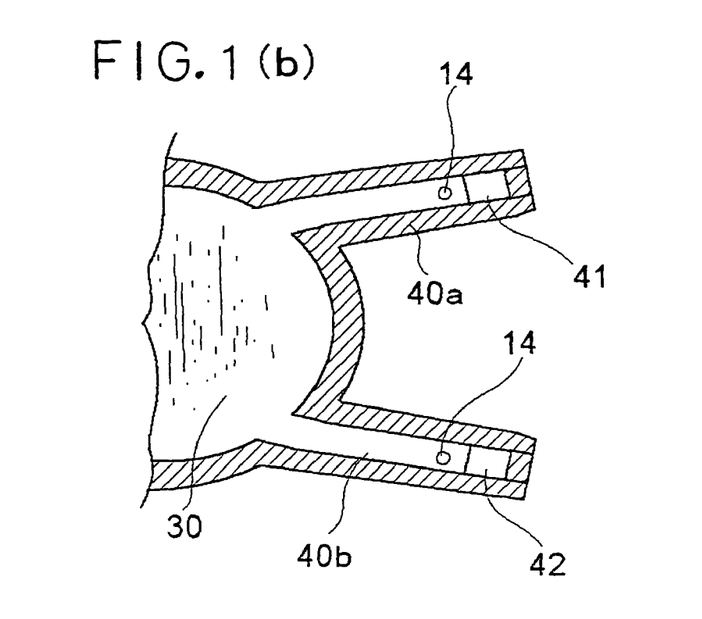

Next, the method of producing glass of the present invention will be described in accordance with a case applicable to an actual glass melting furnace. FIG. 1 show a sectional view of a glass melting furnace to which the production method of the present invention is applied. In the glass melting furnace 10, a glass raw material M of multicomponent-based silicate glass is continuously supplied from a raw material charger 11 installed in a melting chamber 20, and is heated with a burner 13 and an electrode 12 arranged in the melting chamber 20 to be molten glass G. Then, the molten glass G is subjected to a homogenizing operation with an air bubbling A in the melting chamber 20. After that, bubble inclusions in molten glass are eliminated in a throat 60 and a fining chamber 30. After that, the resultant is formed into sheet glass at two sites simultaneously: a forming site 41 and another feeder forming site 42 at the front ends of a feeder 40 and another feeder bifurcating from the clarifying chamber 30. The molten glass G is sufficiently mixed by means of arranged stirrers 14 in such feeders. The amount of glass production at the forming site 41 and that at the forming site 42 were substantially equal to each other (50 ton/day), and a total production rate was 100 ton/day. However, in the glass melting furnace 10, the quality of glass articles was recognized as unsatisfactory from an initial stage of glass production. To be specific, in the forming site 41, the bubble quality of glass articles was good and an production efficiency was high. On the other hand, in the forming site 42, the bubble quality was always relatively inferior.

In view of the foregoing, a helium gas was arranged in such a manner that a helium gas would be sprayed into the surface of a refractory R on a charging end wall, that is, the charging end wall of the melting chamber 20 below the glass raw material charger 11, and helium in the helium diffusion chamber 50 was kept to be always in a pressurized state. Thus, helium was dissolved in the molten glass G through a gap of the refractory R or the like. Then, the values for the volume ratio $^3He/^4He$ in the forming sites 41 and 42 were measured and investigated. That is, the time required for the value for the volume ratio $^3He/^4He$ to be $0.8\times10^{-6}$ or less was determined. As a result, in the forming site 41, it took 16 hours for the value to be $0.8\times10^{-6}$ or less. However, in the forming site 42, it took 13 hours for the value to be $0.8\times10^{-6}$ or less. Therefore, it was shown that there was a difference of 3 hours in time for the value to be $0.8\times10^{-6}$ or less between the forming sites 41 and 42. This showed that, in the forming site 42, short-path glass flow (also referred to as quick flow) in which the molten glass G flew out without having long enough time for melting and fining was formed in the fining chamber 30, the feeder 40, and the like.

In view of the foregoing, in order to improve the short-path glass flow, a series of countermeasures such as temperature conditions for the melting chamber 20 and the fining chamber 30, the charging rate of a glass raw material, and a bubbling condition were taken. As a result, the bubble quality of a glass article in the forming site 42 was improved to be comparable to that in the forming site 41. In this state, the value for the volume ratio $^3He/^4He$ was measured again in the same manner as that described above for confirmation. As a result, the time required for the value for the volume ratio $^3He/^4He$ in the molten glass to be $0.8\times10^{-6}$ or less was 15 hours in the forming site 41, and was 14.8 hours in the forming site 42. Therefore, it was confirmed that the thermal histories of glass flowing to the forming sites were in substantially equal to each other.

As described above, the method of producing glass of the present invention was found to be capable of improving the homogeneity of molten glass. The method was found to be suitable upon production while problems of production conditions and the like were grasped when a change in value for the volume ratio $^3\text{He}/^4\text{He}$ was pursued by introducing helium into molten glass at all times.

Example 3

Next, the method of producing glass of the present invention was applied to a glass melting furnace having substantially the same structure as that of FIG. 1 and having a glass production rate of 65 ton/day. Here, a gas to be supplied from a bubbling site of FIG. 1 was switched from air A to helium K having a value for the volume ratio $^3\text{He}/^4\text{He}$ prepared in advance. 3 days after the switching of the bubbling gas, the molten glass G was collected from the inside of the glass melting furnace. The value for the volume ratio $^3\text{He}/^4\text{He}$ in the collected glass and that in a glass product cooled after forming were compared with each other. As a result, the value for the volume ratio $^3\text{He}/^4\text{He}$ of the molten glass in the furnace collected from the vicinity of the bubbling site of the melting chamber 20 was $0.2\times10^{-6}$ while the value for the volume ratio $^3\text{He}/^4\text{He}$ of the molten glass in the furnace in front of the throat 60 was $0.3\times10^{-6}$. Furthermore, the value for the volume ratio $^3\text{He}/^4\text{He}$ of the product formed as sheet glass was $0.2\times10^{-6}$.

The molten glass G in the furnace near bubbling and the glass product had the same value for the volume ratio $^3\text{He}/^4\text{He}$. Therefore, it was confirmed that the lapse of 3 days caused the molten glass G that had been in the furnace at the time of change of bubbling gas to helium to flow out to be a product. On the other hand, the value for the volume ratio $^3\text{He}/^4\text{He}$ of the molten glass G in the furnace in front of the throat in the furnace was relatively high, so a change in value for the volume ratio $^3\text{He}/^4\text{He}$ was found to be slow. That is, there was suggested a possibility that the molten glass G did not flow out at a site in front of the throat, a stagnant region was formed, and the glass was exposed to a high-temperature environment over a long time period, so the glass became heterogeneous in composition.

In the glass melting furnace, a sheet glass for a flat panel display has been produced so far. However, the presence of a heterogeneous site caused by long-term stagnation has been observed as a cord in the produced sheet glass. Although it can be a cause for a problem such as a low productivity, it has not been clear that what kind of matter should be treated in what kind of manner in order to obtain a good result. Accordingly, trial and error have been repeated. However, a source for the problem has been specified on the basis of the result. Therefore, measures have been taken to the problem. Several days after that, a glass state in which a cord has been significantly improved has been established, so it has become possible to produce glass having high degree of homogeneity.

One week after the time point at which it has become possible to produce a sheet glass having high degree of homogeneity, molten glass was collected from inside the glass melting furnace under a stable condition, and the value for the volume ratio $^3\text{He}/^4\text{He}$ in the collected glass and that in a glass product cooled after forming were compared with each other.

As a result, no such difference of the value for the volume ratio $^3\text{He}/^4\text{He}$ as described above was observed, and a correlation between the value and the homogeneity of glass was confirmed. In this case as well, the value for the volume ratio $^3\text{He}/^4\text{He}$ was measured by means of the same mass spectrometer as that described above.

Example 4

Next, the evaluation of a tubular glass for an electronic component to be used for a xenon flash lamp performed at an initial stage of the present invention will be described below.

The fine tubular glass to be used for the xenon flash lamp is an oxide multicomponent-based silicate glass having 76 mass % $SiO_2$, 1 mass % $Al_2O_3$, 16 mass % $B_2O_3$, 1 mass % MO (M=Sr+Ca+Mg), and 6 mass % $R_2O$ (R=Na+K+Li). The glass is a material having an light internal transmittance (for a thickness of 1 mm) of 95% to 99.9% in the wavelength range of 400 nm to 800 nm because the glass is used for lamp applications. However, it has been pointed out that, as the glass material contains a large amount of boric acid, an evaporation of boric oxide from a molten glass occurs upon melting, so a heterogeneous glass site such as a cord tends to create. Accordingly, the melting of uniform glass material is hardly done, and glass having homogeneous composition is hardly produced.

In view of the foregoing, in order to test the present invention, a helium gas having a value for the volume ratio $^3\text{He}/^4\text{He}$ adjusted in advance was introduced into a furnace by means of bubbling while melting conditions such as a temperature and an atmospheric condition were changed. Then, the selection of an optimum condition out of various melting conditions was attained by measuring the value for the volume ratio $^3\text{He}/^4\text{He}$ of helium. As a result, the selection made it possible that a rejection ratio due to cord inclusion was improved by 2% in comparison with a rejection ratio that had been conventionally observed. It should be noted that the final value for the volume ratio $^3\text{He}/^4\text{He}$ in glass was small as compared to that of melting in the ordinary atmosphere, and its lower limit was $0.85\times10^{-6}$ (0° C., 1 atm).

As is apparent from the above results, the usefulness of the present invention can be understood, and the present invention has a large effect on the production of homogeneous glass in glass melting.

The invention claimed is:

1. A method of producing a glass article comprising the steps of:
   melting a glass raw material by heating;
   homogenizing the molten glass;
   forming the homogenized molten glass into a predetermined shape;
   cooling the shaped formed glass article to room temperature,
   wherein, in at least one of the step of melting a glass raw material by heating and the step of homogenizing the molten glass, a helium gas is brought into contact with the molten glass so that helium is dissolved in a glass article in such a manner that a volume ratio of an isotope of helium with a mass number of 3 to an isotope of helium with a mass number of 4 (0° C., 1 atm) is smaller than a volume ratio of the isotope of helium with a mass number of 3 to the isotope of helium with a mass number of 4 present in the atmosphere (0° C., 1 atm),
   wherein the molten glass is melted and homogenized while the molten glass is evaluated for degree of homogeneity by measuring a volume ratio of the isotope of helium with a mass number of 3 to the isotope of helium with a mass number of 4 in the molten glass, a formed glass article, or a glass article; and setting or changing a production condition for the glass article on the basis of the measured volume ratio.

2. A method of producing a glass article according to claim 1, wherein the helium is dissolved in a glass article in such a manner that the volume ratio of the isotope of helium with a mass number of 3 to the isotope of helium with a mass number of 4 in the glass article is $0.8 \times 10^{-6}$ or less (0° C., 1 atm) and a total content of the isotope with a mass number of 4 and the isotope with a mass number of 3 is $5.0 \times 10^{-5}$ to 2 μl/g (0° C., 1 atm).

3. A method of producing a glass article according to claim 1, wherein the step of homogenizing molten glass results in homogenizing the molten glass in such a manner that a volume ratio of the isotope of helium with a mass number of 3 to the isotope of helium with a mass number of 4 in a glass article is in a range of $1.0 \times 10^{-9}$ to $0.8 \times 10^{-6}$.

* * * * *

UNITED STATES PATENT AND TRADEMARK OFFICE
CERTIFICATE OF CORRECTION

| | |
|---|---|
| PATENT NO. | : 7,823,416 B2 |
| APPLICATION NO. | : 10/576291 |
| DATED | : November 2, 2010 |
| INVENTOR(S) | : Shigeaki Aoki et al. |

It is certified that error appears in the above-identified patent and that said Letters Patent is hereby corrected as shown below:

On the Cover Page

Item (73) Assignee, "Nippon Electric Gas Co., Ltd." should read --Nippon Electric Glass Co., Ltd--.

Signed and Sealed this
Twenty-second Day of February, 2011

David J. Kappos
*Director of the United States Patent and Trademark Office*